United States Patent [19]

Sabia et al.

[11] Patent Number: 6,159,077
[45] Date of Patent: Dec. 12, 2000

[54] COLLOIDAL SILICA POLISHING ABRASIVE

[75] Inventors: Robert Sabia, Big Flats; Harrie J. Stevens, Corning, both of N.Y.

[73] Assignee: Corning Incorporated, Corning, N.Y.

[21] Appl. No.: 09/365,098

[22] Filed: Jul. 30, 1999

[51] Int. Cl.[7] .............................. B24B 1/00; H01L 21/00
[52] U.S. Cl. ............................ 451/36; 216/89; 252/79.1; 428/404; 438/690; 438/693; 451/41
[58] Field of Search .................................. 252/79.1–79.5; 216/88, 89; 438/690, 691, 692, 693, 745; 451/36, 37, 41; 428/397, 400–402, 404, 406; 106/3

[56] References Cited

U.S. PATENT DOCUMENTS

| 5,266,088 | 11/1993 | Sandusky et al. | 51/298 |
| 5,605,490 | 2/1997 | Laffey et al. | 216/89 X |
| 5,997,620 | 12/1999 | Kodama et al. | 216/89 X |
| 6,043,159 | 3/2000 | Jacquinot et al. | 216/89 X |

FOREIGN PATENT DOCUMENTS

| 0 773 270A2 | 5/1997 | European Pat. Off. . |
| 0 826 757A1 | 3/1998 | European Pat. Off. . |
| 0 786 504A3 | 5/1998 | European Pat. Off. . |
| 0 874 036A1 | 10/1998 | European Pat. Off. . |
| 64-40267 | 2/1989 | Japan . |
| 96/38262 | 12/1996 | WIPO . |
| 97/08689 | 3/1997 | WIPO . |
| 97/43087 | 11/1997 | WIPO . |
| 97/47430 | 12/1997 | WIPO . |
| 98/50200 | 11/1998 | WIPO . |

*Primary Examiner*—William Powell
*Attorney, Agent, or Firm*—Angela N. Nwaneri; Patrick P. Pacella

[57] ABSTRACT

This colloidal silica soot is a byproduct of chemical vapor deposition processing of fused silica or ultra low expansion glasses in the finishing industry. The colloidal silica by product is referred to as "soot". Retaining the same physical properties as the parent glass and having a spherical morphology, the colloidal silica soot is an ideal candidate for polishing applications. The soot has a large particle size when compared to conventional colloidal or fumed silica. As a result, the large size produces less surface damage and allows for a higher (faster) removal rate. The large particle size also results in super polished surfaces.

21 Claims, No Drawings

COLLOIDAL SILICA POLISHING ABRASIVE

TECHNICAL FIELD

The invention relates to a polishing agent of colloidal silica soot. The invention also relates to a unique method of polishing substrates using the soot.

BACKGROUND ART

Application of colloidal suspensions for polishing advanced materials has become an exceedingly critical aspect of final part formation for the glass and microelectronics industries. Silica and alumina colloids are formed through various techniques and typically require expensive precursor materials in order to ensure the highest purity products. Solutions are stabilized with buffer systems to pH and solids loading values that result in optimal surface finish attainment. Particle size distribution can be adjusted to control the final surface finish, as well as the ability to clean residue abrasive particles from workpiece surfaces after processing.

The level of polish currently available is currently good enough for use as a photomask of a substrate. The real issue, however, is removal of defects. Limitations in the application of polishes surfaces for electronic grade applications is the formation of and inability to remove surface defects. Especially critical is surface damage from polish abrasive scratching. Small surface imperfections easily distort light. Small particle size abrasives have a low (long) removal rate. Also, hard, optical quality pads scratch the surface when used with conventional small particle size abrasives.

DISCLOSURE OF INVENTION

The present invention provides for the application of colloidal silica produced as a byproduct of chemical vapor deposition processing of fused silica or ultra low expansion glasses in the finishing industry. The colloidal silica by product is referred to as "soot". Retaining the same physical properties as the parent glass and having a spherical morphology, the colloidal silica soot is an ideal candidate for polishing applications. The soot has a large particle size when compared to conventional colloidal or fumed silica. As a result, the large size produces less surface damage and allows for a higher (faster) removal rate. The large particle size also results in super polished surfaces.

Conventional colloidal silica typically has an average particle size of 50 nanometers (nm) or less. Broadly, the colloidal silica soot particulate polishing agent of this invention has an average particle size ranging from above 50 nm to 500 nm. More specifically, the colloidal silica soot has an average particle size ranging from 100 nm to 400 nm.

BEST MODE OF CARRYING OUT INVENTION

Preferably, the colloidal silica soot has an average particle size ranging from 250 nm to 350 nm. More preferably, the colloidal silica soot has an average particle size of about 300 nm. We also prefer that the colloidal silica soot have a spherical morphology.

Generally, the soot has a specific surface area of 20 $m^2/g$ or less. Preferably, the specific surface area is 10 to 20 $m^2/g$ and more preferably the surface area is 15 to 20 $m^2/g$. Particle size and surface area dimension are understood to be greater than zero.

A critical issue in manufacturing colloidal abrasives surround the preparation of the abrasive solution. The solution must be adjusted to a pH that will allow for attainment of the best surface finish and the solution must be stabilized from agglomeration and pH shifts during storage. For conventional colloidal silica abrasives designed for microelectronic applications, buffers solutions using mixtures of various bases and salts are incorporated for stabilization anywhere between pH 5–12. Most common for colloidal silica solutions stabilized for single-crystal silicon polishing is a buffer adjustment to pH 10–11. For the soot, a likewise adjustment was made using a potassium-based buffer solution.

Physical properties for the fused silica (FS) and ultra low expansion (ULE) soot materials are identical to those for the parent glasses from whose manufacturing process the soot is a byproduct. These properties are shown in Table 1 below.

TABLE 1

| Property | FS | ULE |
| --- | --- | --- |
| Density (g/cc) | 2.20 | 2.20 |
| Knoop Hardness (HK100) | 489 | 460 |
| Elastic Modulus (GPa) | 73 | 67 |
| Mean Particle Size (m) | 0.3 | 0.3 |
| Surface Area (m2/g) | 15.7 | 17.7 |

The method of this invention for final polishing silica substrates comprises the steps of providing a silica substrate, first polishing a surface of the substrate with an aqueous solution of at least one metal oxide abrasive to a surface roughness Ra ranging from 6 to 10 Å, and further polishing the surface of the substrate with an aqueous solution of colloidal silica soot having an average particle size ranging from 50 nm to 500 nm to a surface roughness Ra of 5 Å or less. Preferably, a hard polishing pad carries out the first polishing step and a soft polishing pad carries out the further polishing step.

Generally, the metal oxide abrasive is alumina, titania, zirconia, germania, silica or ceria. Preferably, the metal oxide abrasive is cerium oxide.

Generally, the aqueous solution of colloidal silica soot is buffered to a pH ranging from 5 to 12. Preferably, the aqueous solution is colloidal silica soot is buffered to a ph ranging from 9 to 12 and more preferably the aqueous solution of colloidal silica soot is buffered to a ph ranging from 10 to 11.

Generally, the silica substrate is made of silicates or glasses thereof.

EXAMPLE

Polishing experiments were as follows. Samples of fused silica glass were machined via grinding and lapping processes to form a flat surfaces with minimal subsurface damage. A first polishing step was applied to each sample using a cerium oxide abrasive (Ferro Corporation, Product Code 482), and a hard polishing pad (Rodel Incorporated, Product Code MHC-14B), thus generating a surface finish of Ra=8 Å. See Table 2.

Solutions prepared from the soot were buffered using a potassium-based solution between pH 10–11. The solution was used in combination with a soft polishing pad (Rodel Incorporated, Product Code 204). Final surface finishes were measured using an atomic force microscope to have a surface roughness of Ra of approximately 5 Å. See Table 3. Of particular interest in the results was the removal of large scratches by the soot. The beneficial effect of this scratch removal is believed to be the result of the large particle size of the soot.

This data shows the viable use of soot as an abrasive for polishing glass. Results have shown a marked improvement in surface quality for samples of fused silica polished with soot dispersed to pH 10, particularly in the removal of relatively large surface defects such as deep scratches.

Table 2 below shows data from atomic force micrograph of fused silica surfaces polished using cerium oxide as first polishing step. The surface roughness Ra (smoothness) after the first step was 10.34 Å.

TABLE 2

| Image Statistics | |
| --- | --- |
| Img. Z range | 47.947 nm |
| Img. Mean | −0.0002 nm |
| Img. Rms (Rq) | 1.636 nm |
| Img. Ra | 1.034 nm (10.34Å) |

Table 3 below shows data from atomic force micrograph of surface polished using soot. The surface roughness Ra (smoothness) was 5.32 Å.

TABLE 3

| Image Statistics | |
| --- | --- |
| Img. Z range | 25.912 nm |
| Img. Mean | −0.0003 nm |
| Img. Rms (Rq) | 0.796 nm |
| Img. Ra | 0.532 nm (5.32Å) |

The soot material is ideal for polishing applications in the glass and microelectronics industries. Results show the attainment of a final surface finish with Ra of 5 Å. AFM images of final polished surfaces suggest that the soot is particularly successful in removing large scratches that are remnant from previous polishing steps.

Z range is the ratio of peaks to valleys on the polished surface. Rq is the root mean square of the roughness. Ra is the average roughness. The key measurement is Ra.

In addition to these embodiments, persons skilled in the art can see that numerous modifications and changes may be made to the above invention without departing from the intended spirit and scope thereof.

We claim:

1. A particulate polishing agent comprising colloidal silica soot having an average particle size ranging from above 50 nm to 500 nm.

2. A polishing agent according to claim 1 wherein the colloidal silica soot has an average particle size ranging from 100 nm to 400 nm.

3. A polishing agent according to claim 1 wherein the colloidal silica soot has an average particle size ranging from 250 nm to 350 nm.

4. A polishing agent according to claim 1 wherein the colloidal silica soot has an average particle size of about 300 nm.

5. A polishing agent according to claim 1 wherein the colloidal silica soot has a spherical morphology.

6. A polishing agent according to claim 1 having a specific surface area of 20 m2/g or less.

7. A polishing agent according to claim 1 having a specific surface area of 10 to 20 m2/g.

8. A polishing agent according to claim 1 having a specific surface area of 15 to 20 m2/g.

9. A polishing agent according to claim 1 wherein the colloidal silica soot is a byproduct of chemical vapor deposition processing of fused silica or ultra low expansion glasses.

10. A method for final polishing silica substrates comprising the steps of:

providing a silica substrate;

first polishing a surface of the substrate with an aqueous solution of at least one metal oxide abrasive to a surface roughness Ra ranging from 6 to 10 Å;

further polishing the surface of the substrate with an aqueous solution of colloidal silica soot having an average particle size ranging from 50 nm to 500 nm to a surface roughness Ra of about 5 Å or less.

11. A method according to claim 10 wherein a hard polishing pad carries out the first polishing step.

12. A method according to claim 10 wherein a soft polishing pad carries out the further polishing step.

13. A method according to claim 10 wherein the metal oxide abrasive is alumina, titania, zirconia, germania, silica or ceria.

14. A method according to claim 10 wherein the metal oxide abrasive is cerium oxide.

15. A method according to claim 10 wherein the aqueous solution of colloidal silica soot is buffered to a pH ranging from 5 to 12.

16. A method according to claim 10 wherein the aqueous solution of colloidal silica soot is buffered to a pH ranging from 9 to 12.

17. A method according to claim 10 wherein the aqueous solution of colloidal silica soot is buffered to a pH ranging from 10 to 11.

18. A method according to claim 10 wherein the silica substrate is made of silicates, or glasses thereof.

19. A method according to claim 10 wherein the further polishing step removes any scratches that are remnant from any previous polishing steps.

20. A method according to claim 10 wherein the further polishing step removes large scratches that are remnant from the first polishing step.

21. A method according to claim 10 wherein the large particle size of the colloidal silica soot produces less surface damage and allows for a faster removal rate of any scratches in the substances.

* * * * *